US011250681B2

(12) United States Patent
Shaw

(10) Patent No.: US 11,250,681 B2
(45) Date of Patent: Feb. 15, 2022

(54) COMBUSTION PRODUCT DETECTION

(71) Applicant: Tyco Fire & Security GmbH, Neuhausen am Rheinfall (CH)

(72) Inventor: John Shaw, West Drayton (GB)

(73) Assignee: Johnson Controls Fire Protection LP, Boca Raton, FL (US)

( * ) Notice: Subject to any disclaimer, the term of this patent is extended or adjusted under 35 U.S.C. 154(b) by 334 days.

(21) Appl. No.: 14/364,080

(22) PCT Filed: Feb. 13, 2013

(86) PCT No.: PCT/GB2013/050332
§ 371 (c)(1),
(2) Date: Jun. 10, 2014

(87) PCT Pub. No.: WO2013/121192
PCT Pub. Date: Aug. 22, 2013

(65) Prior Publication Data
US 2015/0170490 A1 Jun. 18, 2015

(30) Foreign Application Priority Data

Feb. 13, 2012 (GB) ..................... 1202447

(51) Int. Cl.
*G08B 17/117* (2006.01)
*G01N 21/64* (2006.01)
(Continued)

(52) U.S. Cl.
CPC .......... *G08B 17/117* (2013.01); *G01N 21/53* (2013.01); *G01N 21/64* (2013.01);
(Continued)

(58) Field of Classification Search
USPC ........... 250/339.06, 341.1, 341.7, 393, 459.1
See application file for complete search history.

(56) References Cited

U.S. PATENT DOCUMENTS 5,425,916 A 6/1995 Beer et al.
5,880,830 A 3/1999 Schechter
(Continued)

FOREIGN PATENT DOCUMENTS

GB 2464105 A 4/2010
WO 2006086382 A2 8/2006

OTHER PUBLICATIONS

Dong, C. Y. et al., 'Fluorescence Lifetime Imaging by Asynchronous Pump-Probe Microscopy,' Biophysical Journal, vol. 69, Dec. 1995, pp. 2234-2242.
(Continued)

*Primary Examiner* — David P Porta
*Assistant Examiner* — Carolyn Fin
(74) *Attorney, Agent, or Firm* — HoustonHogle LLP

(57) ABSTRACT

A smoke detector comprising an enclosure communicating with an external environment, within the enclosure a light source illuminating a detection volume in a first wavelength band and a light-sensor responding to light from the sensing volume in a second wavelength band. The detector is configured to sense photo-luminescent fire products, particularly polyaromatic compounds, and actuate an alarm when signal levels indicate a dangerous/fire condition is present. The photo-luminescence detector may be combined with optical scatter or other fire detectors to improve discrimination between fires and false alarm sources.

8 Claims, 5 Drawing Sheets

(51) Int. Cl.
  *G01N 21/53* (2006.01)
  *G08B 17/103* (2006.01)
  *G08B 17/107* (2006.01)
  *G01N 21/47* (2006.01)
  *G08B 17/113* (2006.01)

(52) U.S. Cl.
  CPC ....... *G01N 21/6408* (2013.01); *G08B 17/103* (2013.01); *G01N 2021/4707* (2013.01); *G01N 2021/6493* (2013.01); *G08B 17/107* (2013.01); *G08B 17/113* (2013.01)

(56) References Cited

U.S. PATENT DOCUMENTS

| | | | |
|---|---|---|---|
| 6,744,503 B2 | 6/2004 | Vo-Dinh et al. | |
| 2003/0052281 A1 | 3/2003 | Rader et al. | |
| 2004/0066512 A1 | 4/2004 | Politze et al. | |
| 2007/0097366 A1 | 5/2007 | LeBoeuf et al. | |
| 2007/0194908 A1* | 8/2007 | Ayala | G08B 17/00 340/521 |
| 2008/0002180 A1 | 1/2008 | Gigioli et al. | |

OTHER PUBLICATIONS

Immler, F. et al., Fluorescence from atmospheric aerosol detected by a lidar indicates biogenic particles in the lowermost stratosphere, Atmospheric Chemistry and Physics, vol. 5, Feb. 8, 2005, pp. 345-355.

Kaye, P. H. et al., 'A low-cost multichannel aerosol fluorescence sensor for networked deployment,' Proc. SPIE, vol. 5617, 2004.

Kobayashi, Y. et al., 'Soot precursor measurements in benzene and hexane diffusion flames,' Combustion and Flame 154. Elsevier, 2008, pp. 346-355.

Pan, Y.-L. et al., 'Fluorescence spectra of atmospheric aerosol particles measured using one or two excitation wavelengths: Comparison of classification schemes employing different emission and scattering results,' Optics Express, vol. 18, No. 12, Jun. 7, 2010, pp. 12436-12457.

Pinnick, R. G. et al., 'Aerosol Fluorescence Spectrum Analyzer for Rapid Measurement of Single Micrometer-Sized Airborne Biological Particles,' Aerosol Science and Technology, Elsevier, Feb. 1998, pp. 95-104.

Sivaprakasam, V. et al., 'Multiple UV wavelength excitation and fluorescence of bioaerosols,' Optics Express, vol. 12, No. 19, Sep. 2004, pp. 4457-4466.

International Search Report, dated Apr. 19, 2013, from International Application No. PCT/GB2013/050332 filed Feb. 13, 2013.

International Preliminary Report on Patentability, dated Aug. 19, 2014, from counterpart International Application No. PCT/GB2013/050332, filed on Feb. 13, 2013.

'Detection of aromatic hydrocarbons with LIF (laser induced fluorescence) techniques' obtained from http://www.tempe.mi.cnr.it/zizak/pah/cld2-eng.htm., 2002. Two pages.

Great Britain Combined Search and Examination Report, dated Jun. 13, 2012, for Great Britain Application No. 1202447.7, filed on Feb. 13, 2012. Six pages.

* cited by examiner

PRIOR ART

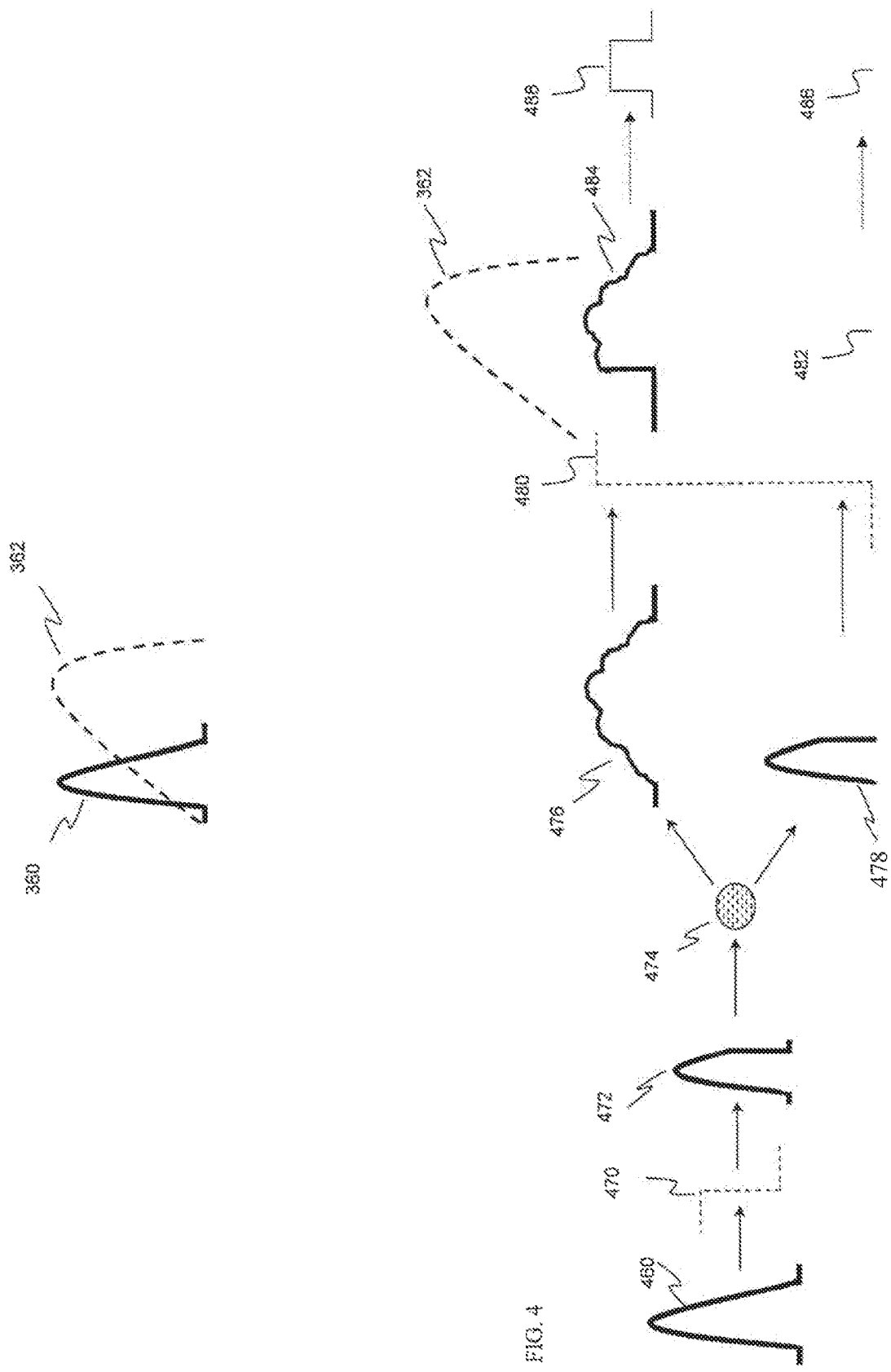

COMBUSTION PRODUCT DETECTION

RELATED APPLICATIONS

This application is a § 371 National Phase Application of International Application No. PCT/GB2013/050332, filed on Feb. 13, 2013, now International Publication No. WO 2013/121192 A1, published on Aug. 22, 2013, which International Application claims priority to Application No. GB 1202447.7, filed on Feb. 13, 2012, all two of which are incorporated herein by reference in their entirety.

FIELD OF EMBODIMENTS OF THE INVENTION

The invention relates to fire detectors, to fire alarm systems having one or more fire detectors, and to a method for detecting fire in an environment.

BACKGROUND

Certain known smoke detectors operate by detection of fire products including smoke by optical scattering. Such devices for monitoring a gaseous environment incorporate a sensing volume into which a sample of said environment is transported by active or passive means, an electromagnetic radiation source illuminating said sample volume, and an electromagnetic radiation sensor positioned non-collinearly with said source to collect electromagnetic radiation from said sample volume. The output from the electromagnetic radiation sensor is taken as a measure of radiation scattered by material within the sample volume and therefore as a measure of the presence and quantity of material within the sample volume capable of causing such radiation scattering.

Optical scatter measurements do not provide information on chemical content of aerosol particles and are subject to false alarms arising from aerosols arising from non fire sources. Partial combustion or pyrolysis of carbon containing fuels are know to produce a range of polyaromatic molecules such as benzopyrene which become incorporated into products aerosols or smokes.

Polycyclic aromatic hydrocarbons (PAH) comprise a large class of organic compounds containing two or more fused aromatic rings. The term 'PAH' can be limited to compounds containing only carbon and hydrogen (i.e. unsubstituted parent PAH and alkyl-substituted derivatives) but PAH and derivatives retaining a polyaromatic structure, which may also be referred to as polycyclic aromatic compounds include the functional derivatives (e.g. nitro- and hydroxy-PAH) and the heterocyclic analogues, which contain one or more hetero atoms in the aromatic structure (aza-, oxa-, and thia-arenes). The extended aromatic bonding within these structures leads to photo-luminescent properties being widespread within the class, with emission wavelengths generally increasing with increasing aromatic centre size.

More than 100 PAH have been identified in atmospheric particulate matter, with a primary origin considered to be combustion processes. PAH compounds identified as combustion products of cellulosic materials include pyrene, fluoranthene, anthracene, phenanthrene, chrysene, benz[a]anthracene, benzo [ghi]-perylene, benzo [c]-phenanthrene, benzofluoranthenes, benzo-pyrenes, and perylene. Many such polyaromatic molecules can be photo-excited to generate characteristic luminescent emissions and such photo-luminescence may be indicative of a combustion origin for an aerosol.

Although optical scatter and photoluminescence are distinguishable phenomenon, it is normal for illumination of an aerosol to generate optical scatter along with any photoluminescence. Further the geometric arrangements for their measurement have some common features. It is therefore appropriate to describe the layout and operation for a conventional optical scatter based fire detector before detailing distinguishing features required for construction of a photo-luminescence based fire detector according to the present invention.

FIG. 1 is a diagrammatic representation of an optical scatter smoke detector of conventional type. The detector 1 consists of a chamber provided within an enclosure 2 having openings (not shown) allowing access to the interior of the chamber by gases and smoke but restricting passage of larger foreign bodies and of light. The use of light-absorbing vanes and pulsed operation to mitigate against effects of external illumination is known technology for optical scatter fire detector devices. The detector is provided with a light source 3 and photo-sensor 4 positioned in a non-collinear arrangement so that a sensing volume 5 illuminated by source 3 is in the field of view of photo-sensor 4. Sensor 4 may be provided with or incorporate wavelength restrictive optical filtering to minimise response to radiation outside the wavelength band provided by source 3. Light-impermeable barriers 6 are provided to restrict direct light transfer from source 3 to sensor 4. Lenses as 7 may be provided with or incorporated in source 3 or sensor 4 or both. The direction of radiation from source 3 incident on sensing volume 5 makes an angle 8 with the direction from sensing volume 5 to photo-sensor 4. For forward scatter sensing as indicated in FIG. 1, angle 8 is less than 90 degrees and most generally is selected to be between 30 and 60 degrees. The bounds of sensing volume 5 are defined by the intersection of illumination beam from source 3 and field of view of photo-sensor 4 as constrained by the positions and structures of source 3, photo-sensor 4 and lenses as 7 and light barriers as 6.

Operating circuitry 9 is linked to the electrical components (source 3 and photo-sensor 41. Device driving and monitoring, and communication and alarm driving functions may be partially of completely provided by circuitry 9 incorporated in the detector 1 or and partially or completely provided by a linked but separate control unit or panel 10. Such a control panel 10 may be linked to multiple detectors of various types and other peripherals including alarms. Detectors incorporating optical scatter smoke detectors of conventional type may also incorporate within the same detector body other sensors such as temperature or carbon monoxide sensors.

Such conventional optical scatter smoke detectors are generally operated with short (~0.01 to ~1 ms) light pulses at intervals of ~1 to ~100 seconds, more generally ~5 seconds, where a source LED may emit in a single wavelength band or where the source or sources may operate with pulsed emissions in two wavelength bands, usually at different times. Scattered radiation sensing is generally by a silicon photo-diode which may cover the near UV to near IR regions or have its response restricted by filter material, often built into the device package.

Activation of a fire alarm may be in response to selected signal levels from the photo-sensor used to sense light scattered from the sensing volume or to related characteristics such as rate of rise, or to combinations with other signals such as from temperature or carbon monoxide sensors. Optical scatter-based fire detectors most generally incorporate light emitting diode (LED) sources operated in a short duration pulsed mode. LEDs applied most generally emit near IR radiation, usually ~850 or 940 nm, but LEDs emitting at other wavelengths, particularly blue (~465 nm), are also in use.

Aerosol particle size and refractive index is known to affect scattering efficiency and scattering angle distribution understood in a qualitative sense to occur in line with Mie scattering theory. Forward scattering of light from a particle, where the angle between incident and scattered light as indicated in FIG. 1 is less than 90 degrees, generally gives rise to higher scattered light intensity than back scattering where the angle between incident and scattered light is greater than 90 degrees. To increase sensitivity conventional scattered light smoke detectors are most generally constructed to measure forward scattered radiation, although use of higher scatter angles is known. It will be understood that a detector sensing volume is defined by the intersection of incident light beam and photo-sensor assembly field of view which both have non-zero width and so in practice measurements are, for a limited range of scatter angles, around that corresponding to the intersection of the central axes of incident beam and photo-sensor assembly field of view.

SUMMARY

While fire detectors employing multiple sources, e.g., blue and near IR LEDs, or measurements at multiple scatter angles, or combinations thereof provide some limited discrimination between aerosol types and are claimed to allow some discrimination between products from real fires and from false alarm stimuli, such as steam or dust, the process of radiation scattering employed does not effectively probe the chemistry of the radiation scattering materials.

It is desirable that fire detection devices should allow robust discrimination between airborne aerosols and/or vapours originating from true fire events or false alarm scenarios. Both real fires and false alarm scenarios can however generate quite complex product mixes with broad size distributions for aerosols making discrimination based on optical scatter characteristics alone difficult and possibly unreliable.

In addition to scattering, interactions between electromagnetic radiation and materials include absorption, which most generally involves conversion of light energy to heat, but can also for some materials include absorption with excitation and re-radiation of energy at wavelengths different that of the illuminating radiation. Photo-luminescence, the process of absorption with excitation and re-radiation with wavelength change, most generally involves emission of luminescent radiation in wavelength bands longer than that for the excitation. Photo-luminescence is dependant on the chemical species and their environments as the required excitation energies and the emission spectra derive from the electronic energy level structure of and are characteristic of the chemical species involved. Photo-luminescence includes photo-excitation of chemical species classified as fluorophors, and such photo-luminescence includes fluorescence and phosphorescence which differ in energy excitation and decay transitions and the emission lifetimes. The spectral characteristics of photo-luminescence associated with bio-molecules, especially NADH and tryptophan, have been used to characterise aerosol particles as being of biological origin e.g. as in reference "Multiple UV wavelength excitation and fluorescence of bioaerosols, Vasanthi Sivaprakasam, Alan L. Huston, Cathy Scotto and Jay D. Eversole, 20 Sep. 2004/Vol. 12, No. 19/OPTICS EXPRESS 4457".

Laser Induced Fluorescence (LIF) studies have shown that incomplete combustion or pyrolysis of carbon-containing fuels can yield fluorescent species, particularly poly-aromatic hydrocarbons (PAHs) which may become absorbed onto or become converted into aerosol (soot) particles, and that photo-excitation by radiation in UV to blue wavelength bands of small to moderate sized poly-aromatic molecules (~2-10 aromatic rings) gives rise to photo-luminescent radiation in the visible to near infrared wavelength band region e.g. as in reference "Soot precursor measurements in benzene and hexane diffusion flames, Y. Kobayashi, T. Furuhata, K. Amagai, M. Arai, Combustion and Flame 154 (2008) 346-355".

While the origin of PAHs are generally associated with combustion or pyrolysis processes, and they have been optically monitored in controlled combustion and flue gases, the application of sensing the presence of these or other photo-luminescent species in air or aerosols for use as an indicator in fire detection directly or for characterisation of or confirmation of nuisance fires registered by other means, such as optical scatter detection, has not been previously proposed.

According to a first aspect of the invention, a fire detector comprises: an enclosure comprising provision for air transfer from an environment into a sensing volume; a source assembly which illuminates said sensing volume in a first electromagnetic wavelength band; and a photo-sensor assembly configured to sense, in a second electromagnetic wavelength band, photo-luminescent emissions resulting from illumination of particles in the sensing volume by radiation in said first electromagnetic wavelength band, the photo-sensor providing an output indicative of said sensed photo-luminescence; wherein said output is an input to a fire condition notification assembly actuated by one or more input signals.

Preferably, the source emission wavelength bands and photo-sensor response wavelength bands are arranged so that they do not overlap. This can be achieved either because of constrained wavelength band characteristics for the source and photo-sensor or by provision within source assemblies or photo-sensor assemblies or both of filtering structures which may be optical wavelength filters or temporal (time based) filters.

According to a second aspect of the invention, a method for detecting fire in an environment, comprises: in a chamber communicating with said environment, shining into a sensing volume within said chamber a light in a first waveband selected to excite photo-luminescence from fire products, and sensing such photo-luminescence as light in a second waveband distinct from said first waveband or during a photo-luminescence decay period after cessation of illumination in the first waveband, generating a signal responsive to the intensity of the photo-luminescence; determining on the basis of said signal, whether a dangerous fire condition is indicated, and actuating an alarm when such dangerous condition is indicated.

BRIEF DESCRIPTION OF THE DRAWINGS

Example embodiments of the invention are hereinafter described with reference to the accompanying diagrams which are not to scale and where:

FIG. 3 is a diagram illustrating wavelength profiles for radiation sources and sensors of the detector of FIG. 2;

FIG. 4 is a diagram illustrating function of optical wavelength filtering in operation of an embodiment as illustrated in FIG. 2;

DESCRIPTION

Figure 1:
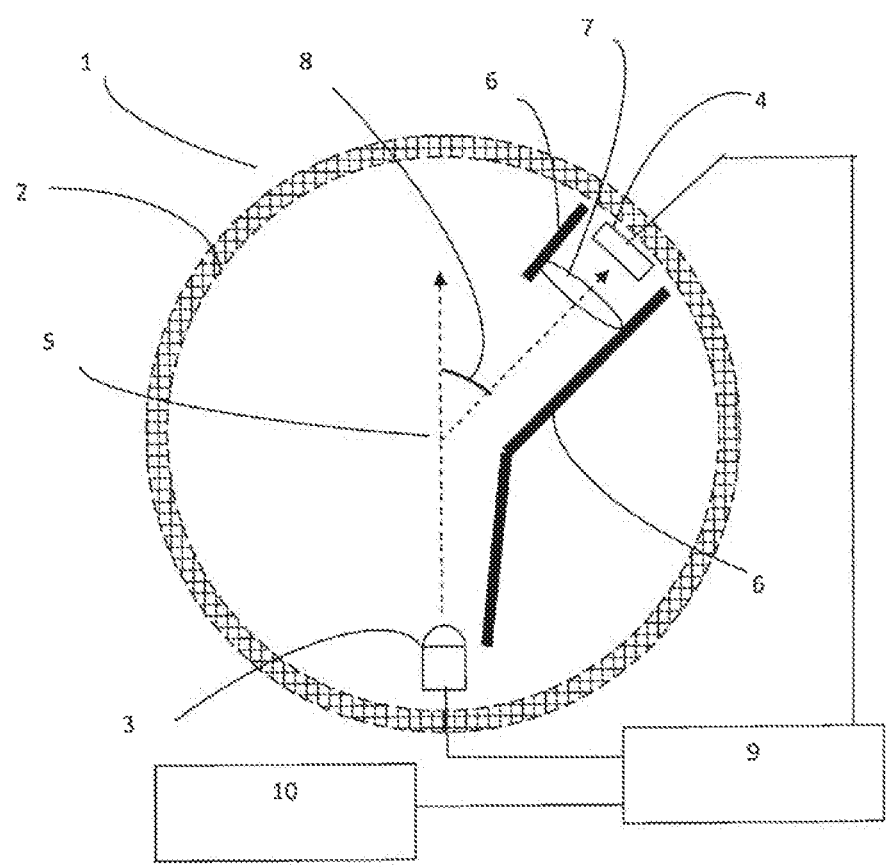
FIG. 1 is a schematic diagram illustrating a detector according to prior art wherein presence of aerosols is detected by optical scatter measurements.

Generation of photo-luminescence (fluorescence or phosphorescence) from materials involves radiation absorption and re-emission at different, usually longer wavelengths, and can be characteristic of the presence of photo-luminescent species (fluorophors). Detection of such luminescence provides indication of the presence of chemical species which is not available for optical scatter measurements.

Sensing of photo-luminescence and differences in photo-luminescent characteristics such as excitation and emission wavelength bands and emission lifetimes may be used to determine whether fluorophors are present and to discriminate between different species and according to the present invention detect presence of fire products including smoke and to distinguish between such products and other aerosols such as steam, dust, and some bio-aerosols.

Light levels generated by photo-luminescence are highly dependant on the presence, concentration, and type of fluorophors present. Pyrolysis or incomplete combustion of carbon-containing fuels can generate a wide range of compounds in fire product vapours or in smoke aerosols, which range of compounds can include photo-luminescent species, particularly poly-aromatic molecules. The absorbed and emitted wavelength bands are dependant on the chemical and structural nature of the photo-luminescent materials and can be used as an identifier or fingerprint of such materials and of fire types. Illumination at visible or UV wavelength of atmospheres or aerosols containing such products can excite luminescent emissions, particularly in the near UV, visible, and near IR wavelength range covered by silicon or InGaAs photo-sensors. Detection of photo-luminescent emissions requires that such emissions be separated from other light, particularly that from the exciting source, either direct or scattered. This separation is achieved by arranging that source emission wavelength bands and photo-sensor response wavelength bands do not overlap either because of constrained wavelength band characteristics for the source and photo-sensor or by provision within source assemblies or photo-sensor assemblies or both of filtering structures which may be optical wavelength filters or temporal (time based) filters. The provision of such separation or filtering is a requirement for identification of photo-luminescence from material present in a sensing volume according to the present invention. In optical scatter smoke detectors of conventional type, photo-luminescent emissions may be present when material in the sensing volume is illuminated, but there is no effective provision for separating or distinguishing such luminescent emissions from scattered light or providing a signal corresponding to such photo-luminescent emissions alone. In such conventional detectors any photo-luminescence may not be readily distinguished from the scattered radiation.

According to the present invention, discrimination between fire types, as well as between fires and non-fire sources is improved by measuring photo-luminescence such as fluorescence or phosphorescence of air borne materials including molecular compounds and especially compounds in aerosols. Detectors according to the present invention are provided with means to sense radiation in wavelength bands associated with photo-luminescent emissions associated with products of combustion and pyrolysis and particularly poly-aromatic hydrocarbons or structurally related compounds, and to sense that such emissions are at levels associated with presence of fire. This characterization on the basis of photo-luminescence aids discrimination between fire types as well as between fires and non-fire sources. Photo-luminescence information, which may include its absence, spectral distribution or temporal distribution, can be utilized to indicate material identity and whether the signal is representative of a real hazard event, aiding discrimination between fire types or other event or hazard, or representative of a false alarm stimulus.

Optical sources for use in photo-luminescence based fire detection may be Gallium Nitride-based LEDs, variants of which emit radiation in wavelength bands within the range 200 to 600 nm, and for the present application emission wavelength bands may for example be selected in the near UV to blue regions, ~320 to 480 nm. Other compact visible/UV emitters may in principle be employed including LEDs based on other high band-gap semiconductor systems, e.g. diamond, zinc oxide, and boron nitride. Other suitable visible/UV sources include lasers, devices utilising up-converting phosphors or nonlinear materials, and discharge lamps including relatively high pressure micro-plasma devices. While excitation source wavelengths in the near IR can also excite photo-luminescence from some fluorophors including larger poly-aromatic molecules, application within the range covered by currently known silicon and InGaAs photo-sensors may be limited.

Preferred photo-sensor for use in detectors according to the present invention include silicon photo-diodes as for conventional optical scatter sensing, but other photo-sensors may be employed including but not limited to other semiconductor based photo-diodes, PIN photo-diodes, avalanche photo-diodes, photo-resistors, photo-transistors, LEDs operated in reverse mode as photo-sensors, CCDs, phototubes, and photomultiplier tubes. As available photo-luminescence intensities will generally be low, photo-sensors are selected, configured, or operated to allow measurements of low intensity. Suitable photo-sensors for use in detectors based on sensing relatively low photo-luminescence intensities according to an embodiment of the present invention include, but are not limited to, silicon photodiodes, PIN devices (p-type/intrinsic/n-type diodes), avalanche photo-diodes, and photo-tubes and photomultiplier devices. Photo-sensors with fast response characteristics may be selected where temporal filtering is used with relatively short decay life-time fluorescent emissions.

As an alternative to optical wavelength selective transmission filters operating by absorptive, reflective, or interference means, which may include electrochromic filter structures, selection of wavelength bands for photo-excitation and luminescence sensing may be achieved by refractive or diffractive optical structures. Multiple optical sensors or sensor and filter combinations may be used to obtain information over multiple photo-luminescence wavelength bands. Optical filtering, refractive, and diffractive optics may be used individually or in combination to provide spectral separation and in combination with detectors or detector arrays used to obtain information over multiple photo-excitation and photo-luminescent emission wavelength bands. Multiple sources may be employed together or sequentially to provide stimulus in different wavelength bands to excite luminescence from material entering the sensing region.

Photo-luminescence based characterisation for fire detection may be used alone or more advantageously in combination with conventional optical scattering smoke detection methods.

Embodiments of photo-luminescence based detection or characterisation of fire or fire products may be realized by detectors structurally similar to those used conventionally for detection of smoke by optical scatter, but with additional structures or components allowing photo-luminescent emissions to be distinguished from optical scatter.

Embodiments of photo-luminescence based detection or characterisation of fire or fire products may be realized by providing a source assembly that emits radiation limited to a selected first wavelength band, for example within but not necessarily including all of the UV to visible region (200-600 nm), and a photo-sensor assembly which may include selective structures, either optical or electronic, configured to produce a response selectively to radiation in a selected second wavelength band not coincident with the selected first wavelength band. The second wavelength band, for example within but not necessarily including all of the near UV or visible to near IR region (300-1200 nm), is selected to include emissions from photo-luminescence of fluorophors such as polyaromatic compounds arising from combustion.

The source and photo-sensor may be positioned with respect to each other and to opaque barriers such that radiation from the source does not pass directly to the photo-sensor. Photo-luminescent emissions are more isotropic than scattered radiation although generally much weaker. For luminescence detection, the photo-sensor may be placed where scattered radiation intensity is relatively low. For example, the photo-sensor may be positioned such that the direction of radiation from the sensing volume towards the photo-sensor makes an angle to the direction of radiation incident on the sensing volume of greater than 70 degrees, preferably between 90 and 180 degrees.

As with optical scatter- and optical absorption-based fire detectors, it is important to ensure that changes in ambient lighting do not deleteriously affect the optical detection system. For this purpose, suitable light absorbing vanes or labyrinths around the detection chamber to prevent light ingress may be employed. Pulsed operation of optical sources and optical sensing both with and between pulses allow monitoring of any light ingress and adjustment of alarms levels as required.

A detector according to an embodiment of the present invention incorporates means such that photo-luminescent emissions from material in the sensing volume may be sensed separately from scattered light from the sensing volume, which means may be provided wholly or partially by choice of source e.g. laser or photo-sensor with suitably constrained emission or response wavelength band characteristics or by employing light filtering in source assemblies or in photo-sensor assemblies, or both, or by use of use of time based filtering of photo-sensor signals.

Figure 2:
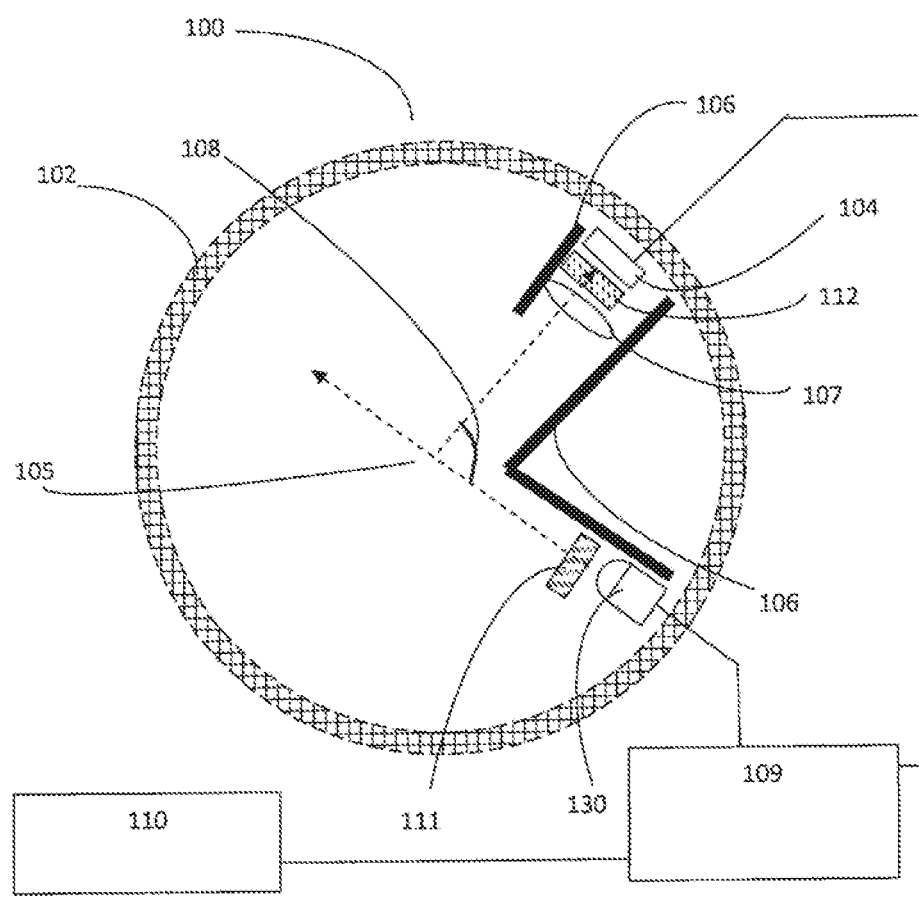
FIG. 2 is a schematic diagram illustrating a detector according to an embodiment of the invention wherein sensing of photo-luminescence of airborne material is enabled.

FIG. 2 is a diagrammatic representation of a detector 100 for detection of fire by sensing presence of fire products by photo-luminescence according to an embodiment of the present invention. The structure of the detector is similar to that of a conventional optical scatter detector as illustrated in FIG. 1, however the embodiment represented in FIG. 2 employs optical wavelength filters to separate photo-luminescent emissions from scattered light. The fire detector may further include an alarm sounder, or may be connected to a fire alarm system which generates an alarm signal upon detection of a fire by the fire detector.

Detector 100 of FIG. 2 consists of a chamber provided within an enclosure 102 having openings (not shown) allowing access to the interior of the chamber by gases and smoke but restricting passage of larger foreign bodies and of light. The detector is provided with a light source 130 providing illumination in a selected wavelength band in the UV to visible range. A first filter 111 may be provided to restrict the wavelength band of light entering the sensing volume as described with reference to following FIG. 4. A second filter 112 may be provided to block the wavelength band corresponding to light entering the sensing volume from source 130 and to pass photo-luminescent emissions from sensing volume 105 to photo-sensor 104. The source 130 and photo-sensor 104 are positioned in a non-collinear arrangement such that the sensing volume 105, illuminated by source 103, is in the field of view of photo-sensor 104. The angle 108 between light incident on the sensing volume and the direction from sensing volume to photo-sensor is preferably greater than 30 degrees and more preferably in the range 70 to 180 degrees. To achieve angles close to 180 degrees the radiation source 130 and photo-sensor 104 may be incorporated in a single package. Filters 111 and 112 may be incorporated into source 130 and photo-sensor 104 respectively or components for source 130 and photo-sensor 104 may be arranged to have selected non-overlapping emission and sensing wavelength band characteristics. Light-impermeable barriers 106 are provided to restrict direct light transfer from source 130 to sensor 104. Lenses such as lens 107 may be provided with or incorporated into source 130 or sensor 104 or both. The bounds of sensing volume 105 are defined by the intersection of illumination beam from source 130 and field of view of photo-sensor 104 as constrained by the positions and structures of source 130, photo-sensor 104 and lenses as 107 and light barriers as 106.

Operating circuitry 109 is linked to the electrical components (source 130 and photo-sensor 104). Device driving and monitoring, and communication and alarm driving functions may be partially of completely provided by circuitry 109 incorporated in the detector 100 or partially or completely provided by a linked but separate control unit or panel 110. Control panel 110 may be linked to multiple detectors of various types and other peripherals including alarms. Detectors operating by sensing of fire product photo-luminescence according to the present invention may also incorporate within the same detector body other sensors such as optical scatter smoke sensors, ionization type smoke sensors, light obscuration sensors, carbon monoxide sensors, flame electromagnetic emission sensors, and temperature sensors. Algorithms operating in hardware or software within local and/or remote electronics may collectively analyze and/or combine the signals. As for conventional single or multiple sensor fire detectors, alarm threshold levels deriving from algorithms applied to photoluminescence based detectors, or to detectors based on photoluminescence and other fire detection sensors in combination, are selected to meet requirements contained within relevant fire detection standards e.g. UL217, EN54/7 such as times to alarm for specified standard fires.

Separation of photoluminescence from optical scatter, based on optical wavelength filtering, may be performed by one or more optical filters such that light from the optical source does not pass to or is not detected by the photo-sensor while at least part of the light in the wavelength band associated with photo-luminescent emissions from fire products does pass to and is sensed by the photo-sensor. The operation of optical wavelength filtering as applied for the embodiment represented in FIG. 2 is illustrated with reference to FIGS. 3 and 4.

With reference to FIG. 2, FIG. 3 is an exemplary diagrammatic representation of the overlap of the emission intensity versus wavelength profile 360 of the light emitted by a typical near-UV or blue light source 130 and the relative photo-sensitivity versus wavelength profile 362 corresponding to a typical photo-sensor 104.

With reference to FIG. 2 and FIG. 3, FIG. 4 is a diagrammatic representation of stages in the process of radiation transmission from source 130 with scatter and photo-luminescence from a particle in sensing volume 105 to generation by photo-sensor 104 of a signal corresponding only to the photo-luminescence. The source emission has a wavelength profile 460. After passing through source filter 111, with long wavelength cut off characteristics 470, the filtered source emission has filtered wavelength profile 472. This beam is incident on material present in the sensing volume 105 represented as particle 474 consisting of or containing material such that the filtered radiation beam may in part be scattered and in part be absorbed with some subsequent excitation and photo-luminescent emission. The scattered radiation has a wavelength profile 478 essentially identical to that 472 of the incident radiation. The photo-luminescent emission, on the other hand, has a wavelength profile 476 dependant on the photo-luminescent species present in material represented as particle 474. Profile 476 is generally spread to wavelengths longer than the exciting incident radiation but if incident wavelength profile 472 has significant spread, there may be some overlap of profiles 476 and 478.

Scattered and photo-luminescent radiation passes through detection filter 112. Detection filter 112 may have short wavelength cut off characteristics 480. The filter characteristics 480 are selected such that they overlap with filter characteristics 470 so that in combination little or no radiation direct or scattered from source 130 can pass to photo-sensor 104, as indicated by zero or very low radiation profile 482, which incident on the photo-sensor produces a zero or very low signal level 486. The filter characteristics 480 are further selected such that a substantial proportion of the photo-luminescent radiation with profile 476 is passed, resulting in wavelength profile 484. Profile 484 includes wavelengths within the photo-sensor sensitivity profile 362 such that a signal 488 indicative of photo-luminescence from particle 474 is produced from the photo-sensor 104.

For cases where material in the sensing volume represented as particle 474 does not include photo-luminescent material, no photo-luminescent emissions will be generated and no measureable signal 488 will be produced.

Alternatively, or in addition to the previously described techniques, use may be made of temporal filtering based on luminescence decay times for fluorescent or phosphorescent species upon cessation of excitation. Simple optical scatter does not show significant decay times. The temporal filtering is generally achieved by electronic filtering means; the photo-sensor signal is monitored in a period following completion of the source excitation pulse.

The operation of temporal wavelength filtering is illustrated with reference to FIGS. 3 and 5 as applied for an embodiment which may be represented as in FIG. 2 with optical wavelength filters 111 and 112 omitted and wherein the temporal filtering process is incorporated in electrical operating circuitry 109.

Use of temporal filtering to separate signals arising from optical scatter and photo-luminescence as described with reference to FIG. 5 requires photo-sensor sensitivity to the photo-luminescent emissions characteristic of fire products but is also compatible with sensitivity to the source radiation illuminating the sensing volume. Temporal filtering in combination with photo-sensor assembly sensitivity covering wavelengths for optical scatter and photo-luminescence can allow separate measurements of both photoluminescence and scatter.

Figure 5:
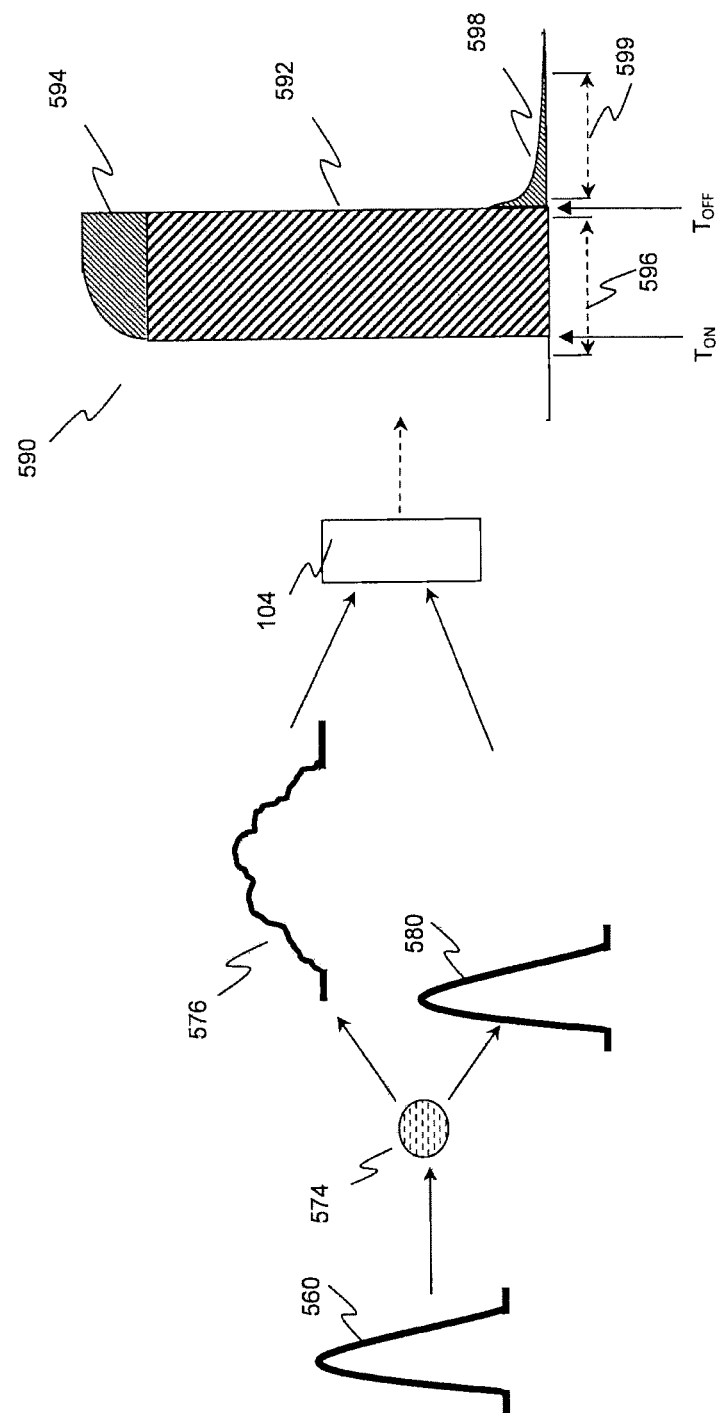
FIG. 5 is a diagram illustrating function of temporal filtering in operation of an embodiment.

FIG. 5 is a diagrammatic representation of stages in the process of transmission of a radiation pulse from a source emitting in the near UV or visible regions with scatter and photo-luminescence from aerosol particles in the detector sensing volume to generation of a signal sequence from a photo-sensor which allows optical scatter to be distinguished from photo-luminescence. The source emission pulse having wavelength profile 560 is incident on material present in the sensing volume represented as particle 574 consisting of or containing material such that the radiation beam may in part be scattered and in part be absorbed with some subsequent excitation and photo-luminescent emission. The scattered radiation has a wavelength profile 580 essentially identical to that 560 of the incident radiation. The photo-luminescent emission has a wavelength profile 576 dependant on the photo-luminescent species present in material represented as particle 574. Profile 576 is generally spread to wavelengths longer than the exciting incident radiation but if incident wavelength profile 560 has significant spread, there may be some overlap of profiles 580 and 576.

The photo-sensor 104 generates an electrical signal sequence 590 in response to sensed scattered and photo-luminescent radiation. Signal sequence 590 comprises a contribution 592 arising from the scattered radiation terminating at time $T_{OFF}$ when the source emission pulse is terminated, a contribution 594 arising from the photo-luminescent emission in the period 596 coincident with emissions from the source 130, and a contribution 598 from photo-luminescent emissions during a decay period 599 after the source emission pulse is terminated.

Sampling within a period 599 commencing at or shortly after the source pulse termination and terminating before the next source pulse provides a measure of photo-luminescent emissions alone.

Sampling the signal within a period 596 terminating at or just before the source pulse termination provides a measure of optical scatter and photo-luminescence together. The contributions are not distinguishable within this period but will normally be heavily dominated by the optical scatter signal. Photo-sensor signal sections within a period 596 including the source pulse period but ending at or before pulse termination and separately within a period 599 commencing at or shortly after the source pulse termination and terminating before the next source pulse provide separate but complimentary measures of optical scatter and photo-luminescent emissions.

For cases where material in the sensing volume represented as particle 574 does not include photo-luminescent material, no photo-luminescent emissions will be generated and no measureable signal in period 599 will be produced.

In addition to distinguishing between materials which do show photo-luminescence from those that do not, not only can short luminescent lifetime fluorophors be distinguished from those with extended lifetimes such as phosphors, but also different fluorescent materials with different but relatively short luminescent lifetimes can be distinguished from each other. Thus, poly-aromatic hydrocarbon species can be distinguished from some photo-luminescent species of non-fire origins such as biological aerosols. Use of such time-based filtering as well as variants on methods using multiple optical pulses including input at wavelengths longer than the luminescence excitation wavelengths such as in pump-probe fluorescence measurements may optionally be included within fire detection equipment. Relevant operation of pump-probe fluorescence is described in reference "Fluorescence Lifetime Imaging by Asynchronous Pump-Probe Microscopy, C. Y. Dong, P. T. C. So, T. French, and E. Gratton, Biophysical Journal Volume 69 December 1995 2234-2242".

Application of photo-luminescence to detect and characterise fire products may be operated either in the same housing or separately in combination with other detector types, particularly those conventionally used for fire detection. Further, photo-luminescence sensing may be combined with optical scatter smoke sensing structures using radiation from the same or different sources or source assemblies, and including scatter in one or more wavelength bands. To conserve power and maximize source lifetime, especially for UV or blue LED source, sources for exciting photo-luminescence for detection may be operated with longer intervals between pulses than used for the sources of optical scatter smoke detection sources or operated only when measurements of scattered light, especially from longer wavelength, e.g. near IR, sources indicates the presence of aerosols or smoke for characterization. Avoiding excessive signal-to-noise issues with such photo-sensor is achieved by application when simple scatter or other smoke detection means indicates the presence of significant aerosol levels. Although a rise in optical scattering is the most obvious event to trigger application of the photo-luminescent detection process, this might also be based on changes indicated by optical absorption, by ionisation type smoke detectors, CO or other gas detectors, flame detectors, or heat detectors.

Fire detectors incorporating fire product luminescence measurements as described above may be distributed about a building or area to be protected as a series of point detectors. Alternatively detectors incorporating fire product luminescence measurements as described above may be used with aspirated fire detection systems where airflows from one or more areas to be protected are carried by suitable piping or ducts to the detector system.

The fire detector in this embodiment may further include an alarm sounder, or may be connected to a fire alarm system which generates an alarm signal upon detection of a fire by the fire detector.

Figure 6:
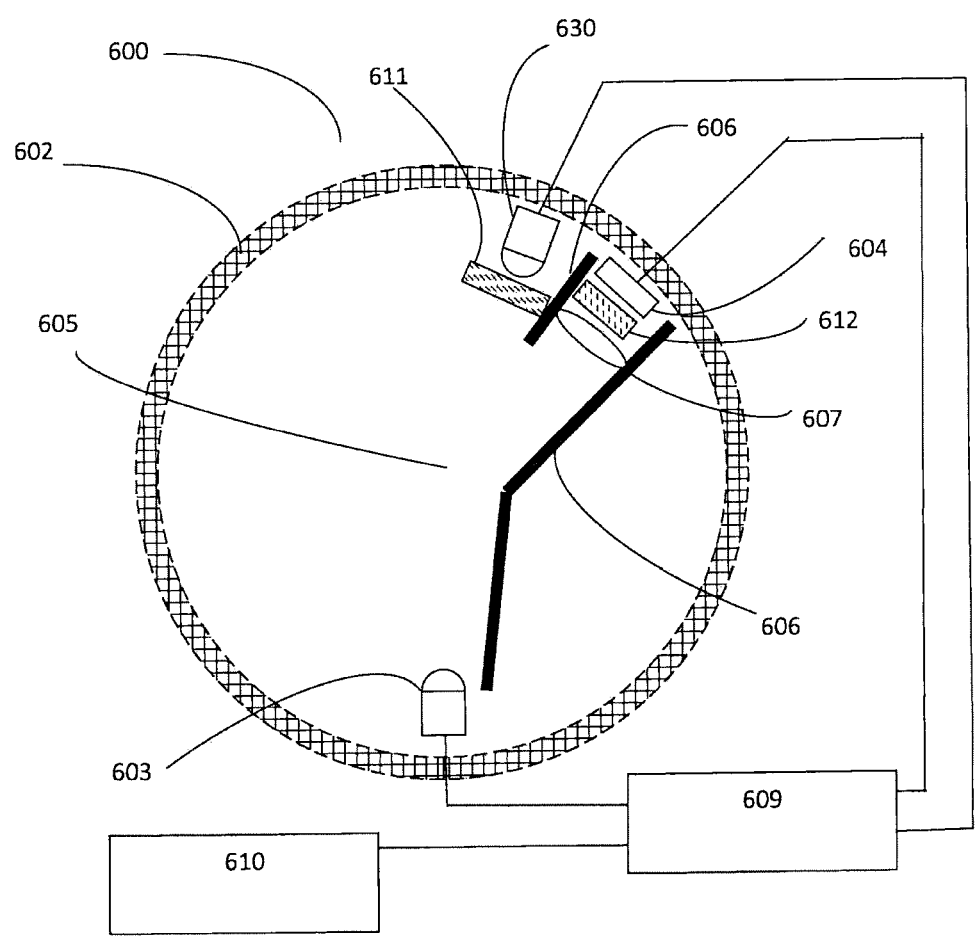
FIG. 6 is a schematic diagram illustrating a detector according to an embodiment of the invention wherein, in addition to sensing of photo-luminescence, sensing of optical scattering of airborne material is enabled in a single detector housing.

FIG. 6 is a diagrammatic representation of an embodiment of the present invention arranged to perform photo-luminescence detection using optical wavelength filter separation, in addition to conventional optical scatter detection of aerosols. The two sources 603 and 630 are pulsed so that their emissions are not coincident in time. Source 630 is selected to emit in a wavelength band able to excite photo-luminescence from fire products, which wavelength band will be from within the UV to visible range, preferably within a wavelength band range from 300 to 500 nm. Source 603 is selected to emit in a wavelength band not significantly exciting photo-luminescence from fire products, which wavelength band will be within the visible to near infra red range, preferably within a wavelength band from 700 to 1200 nm, and most preferably in the range 800 to 1000 mm. In the embodiment represented in FIG. 6, a single photo-sensor is provided sensitive to radiation in the wavelength band emitted by source 603 and to radiation in a wavelength band including at least part of photo-luminescent emissions excited from fire products by emissions from source 630. It will be understood that alternatively multiple photo-sensors collectively providing such wavelength band coverage may be employed.

The detector 600 consists of a chamber provided within an enclosure 602 having openings (not shown) allowing access to the interior of the chamber by gases and smoke but restricting passage of larger foreign bodies and of light. For optical scatter detection a first light source 603 and photo-sensor 604 sensitive to emissions in the wavelength band emitted by light source 603 is provided positioned non-collinearly, preferably for forward scatter sensing. Lens 607 and filter 612 are selected to transmit radiation in the wavelength band emitted by source 603. A sensing volume 605 within the field of view of sensor 604 is illuminated by source 603. For photo-luminescence detection, a second light source 630 is provided also positioned non-collinearly with sensor 604, preferably so as not to correspond to forward scatter sensing. A volume illuminated by source 630 and within the field of view of sensor 604, constitutes a sensing volume for photo-luminescence sensing which volume is preferably at least partially coincident with the sensing volume 605 for optical scatter sensing. Light-impermeable barriers 606 are provided to restrict direct light transfer from sources 603 and 630 to sensor 604. One or more lenses, such as lens 607, may be provided with or incorporated into sources 603 and 630 and sensor 604. Optical filter 611, where provided, is selected to pass a substantial portion of the wavelength band for radiation emitted by source 630. Optical filter 612 is selected to pass radiation in a wavelength band corresponding to photo-luminescence from fire product particles within sensor volume 605 but not pass radiation in the wavelength band for radiation emitted by source 630.

Operating circuitry 609 is linked to the electrical components (first light source 603, second light source 630 and photo-sensor 604). Device driving and monitoring, and communication and alarm driving functions may be partially or completely performed by circuitry 609 incorporated in the detector 600 or partially or completely performed by a linked but separate control unit or panel 610. Such a control panel 610 may be linked to multiple detectors of various types and other peripherals including alarms.

The fire detector may further include an alarm sounder, or may be connected to a fire alarm system which generates an alarm signal upon detection of a fire by the fire detector.

A fire detector comprises an enclosure allowing air transfer from an environment into a sensing volume, a source assembly arranged to illuminate the sensing volume in a first electromagnetic wavelength band, a photo-sensor assembly configured to sense, in a second electromagnetic wavelength band, photo-luminescent emissions resulting from illumination of particles of fire products in the sensing volume by radiation in said first electromagnetic wavelength band, a photo-sensor of the photo-sensor assembly configured to generate an output indicative of the sensed photo-luminescence, and a fire condition notification assembly configured to generate fire alarms in response to said output of said photo-sensor assembly. The source assembly is operated in a pulsed illumination mode and time based electrical signal filtering is applied to the output of the photo-sensor assembly such that said output from a time period after completion of any illumination pulse coincident to at least part of a decay period for photo-luminescence provides a measure of said photo-luminescence. Additionally, a first source and the second source of the source assembly are operated in a pulsed illumination mode and wherein time based electrical signal filtering is applied to the output of the one or more photo-sensors.

The invention claimed is:

1. A fire detector comprising:
a first source arranged to illuminate a sensing volume in an ultraviolet to visible electromagnetic wavelength band including wavelengths from 300 to 500 nanometers, the sensing volume being in an enclosure and containing air from an environment;
a second source arranged to illuminate said sensing volume in a near infrared electromagnetic wavelength band including wavelengths from 700 to 1200 nanometers;
one or more photo-sensors that are sensitive to: 1) photo-luminescent emissions resulting from illumination of particles of fire products including polyaromatic hydrocarbons and derivatives retaining a polyaromatic structure in the sensing volume by radiation in said ultraviolet to visible electromagnetic wavelength band and 2) scattered light in the near infrared electromagnetic wavelength band;
light-impermeable barriers for restricting direct light transfer from the first source and the second source to the one or more photo-sensors; and
operating circuitry responsive to the one or more photo-sensors, the operating circuitry being linked to electrical components of the first source, the second source, and the one or more photo-sensors and the operating circuitry being configured to perform device driving, monitoring, communication, and alarm driving functions,
wherein the first source and the second source are configured to be pulsed so that emissions of the first source and the second source are not coincident in time, the second source and the one or more photo-sensors sensitive to scattered light in the near infrared electromagnetic wavelength band are positioned non-collinearly for forward scatter sensing, and the first source and the one or more photo-sensors are positioned non-collinearly so as not to correspond to forward scatter sensing.

2. The fire detector according to claim 1 wherein said first source includes at least one of: a LED, a LASER, or a discharge source, the discharge source including a microplasma device.

3. The fire detector according to claim 1 wherein said one or more photo-sensors are configured to detect radiation from said sensing volume from within the wave length range 300 nm to 1200 nm and comprises at least one of: a silicon photo-diode, a semiconductor based photo-diode, a PIN photo-diode, an avalanche photo-diode, a photo-resistor, a photo-transistor, a LED operated in reverse mode as a photo-sensor, a CCD, a phototube, or a photomultiplier tube.

4. The fire detector according to claim 1, further comprising a plurality of radiation barriers and a plurality of absorbing structures.

5. The fire detector according to claim 1, further comprising one or more additional fire detection sensors configured to detect presence of at least one product associated with fire including smoke, carbon monoxide, flame, or heat.

6. The fire detector according to claim 1, further comprising a photo-sensor assembly that comprises the one or more photo-sensors, wherein the photo-sensor assembly is configured to produce a response selectively to the radiation in wavelength bands corresponding to radiation emitted by the second source and to photo-luminescence from the fire products.

7. The fire detector according to claim 1, wherein the one or more photo-sensors can discriminate between: 1) the photo-luminescent emissions resulting from the illumination of particles of fire products including polyaromatic hydrocarbons and derivatives retaining a polyaromatic structure in the sensing volume by radiation from the first source in said ultraviolet to visible electromagnetic wavelength band and 2) the scattered light in the near infrared electromagnetic wavelength band corresponding to radiation emitted by the second source.

8. A fire detector comprising:
a first source arranged to illuminate a sensing volume in an ultraviolet to visible electromagnetic wavelength band including wavelengths from 300 to 500 nanometers, the sensing volume being in an enclosure and containing air from an environment;
a second source arranged to illuminate said sensing volume in a near infrared electromagnetic wavelength band including wavelengths from 700 to 1200 nanometers;
one or more photo-sensors that are sensitive to: 1) photo-luminescent emissions resulting from illumination of particles of fire products including polyaromatic hydrocarbons and derivatives retaining a polyaromatic structure in the sensing volume by radiation in said ultraviolet to visible electromagnetic wavelength band and 2) scattered light in the near infrared electromagnetic wavelength band;
a lens for transmitting radiation in a wavelength band corresponding to radiation emitted by the second source;
a first optical filter for transmitting radiation in wavelength bands corresponding to radiation emitted by the second source and to photo-luminescence from the fire product particles and for blocking radiation in a wavelength band for radiation emitted by the first source;
a second optical filter for passing radiation in a portion of the wavelength band corresponding to radiation emitted by the first source;
light-impermeable barriers for restricting direct light transfer from the first source and the second source to the one or more photo-sensors; and
operating circuitry responsive to the one or more photo-sensors, the operating circuitry being linked to electrical components of the first source, the second source, and the one or more photo-sensors and the operating circuitry being configured to perform device driving, monitoring, communication, and alarm driving functions,
wherein the first source and the second source are configured to be pulsed so that emissions of the first source and the second source are not coincident in time, the second source and the one or more photo-sensors sensitive to scattered light in the near infrared electromagnetic wavelength band are positioned non-collinearly for forward scatter sensing, and the first source and the one or more photo-sensors are positioned non-collinearly so as not to correspond to forward scatter sensing.

* * * * *